United States Patent [19]

Allard

[11] 4,413,668

[45] Nov. 8, 1983

[54] THERMAL SIGNATURE SUPRESSION

[76] Inventor: Edward F. Allard, 8904 LaGrange St., Lorton, Va. 22079

[21] Appl. No.: 128,031

[22] Filed: Mar. 7, 1980

[51] Int. Cl.³ .............................................. F24H 3/00
[52] U.S. Cl. ........................................ 165/1; 165/47; 136/205; 343/18 E; 89/36 N; 428/919
[58] Field of Search .................. 165/1, 47, 129, 135; 343/18 R, 18 E; 89/36 N; 60/669, DIG. 10; 428/919; 52/169.5; 219/367; 136/205, 204

[56] References Cited

U.S. PATENT DOCUMENTS

| | | | |
|---|---|---|---|
| 2,114,238 | 4/1938 | Rabatel | 165/106 |
| 3,300,781 | 1/1967 | Clough et al. | 343/18 R |
| 3,623,546 | 11/1971 | Banthin | 165/106 X |
| 4,142,015 | 2/1979 | Bienz | 428/919 X |
| 4,218,266 | 8/1980 | Guazzoni | 60/320 X |
| 4,263,963 | 4/1981 | Ghiraldi | 165/47 |

FOREIGN PATENT DOCUMENTS

| | | | |
|---|---|---|---|
| 414475 | 8/1934 | United Kingdom | 219/367 |
| 427023 | 4/1935 | United Kingdom | 219/367 |

Primary Examiner—Samuel Scott
Assistant Examiner—Margaret A. Focarino

[57] ABSTRACT

Thermal suppressors and techniques for the use thereof are utilized to reduce the thermal signature of an object having a temperature greater than its environment. Multi-layers of low emissivity materials separated by air spaces are used to minimize heat transfer by radiation. This design, coupled with a technique for inducing air flow through the spaces between the various layers for cooling the outer surface of the suppressor, effectively reduces the temperature of and thus the thermal signature of the object. Air entrainment means attached to the object may be used in conjunction with the multi-layered suppressor to further aid in collecting, funneling and expelling heat emanating therefrom. Means for dissipating solar energy are also incorporated into the suppressor.

2 Claims, 23 Drawing Figures

THERMAL SIGNATURE SUPRESSION

BACKGROUND OF THE INVENTION

1. Field of the Invention

This invention disclosure relates to thermal suppression and more particularly to a means and technique for reducing the thermal signature of equipment, such as engines and generators, to a level whereby the temperature of the equipment would be essentially indiscernable from the background temperature.

2. Description of the Prior Art

It is well known that modern thermal systems can detect and recognize, at very long ranges, targets having a temperature differential as small as 6° C. above the background temperature. Such a detection capability clearly amplifies the necessity for developing more efficient means and techniques for suppressing detectable thermal radiation.

Engine-generator (EG) sets, for instance, have outstanding thermal signatures due to their hot surfaces and hot engine parts which, in some instances, exceed 300° C. All EG sets are very hot by definition and are easily detectable. Such a high thermal visibility for EG sets presents a very serious military problem and will become increasingly more serious as thermal detectors become more common for field use. Obscuring, from detection and recognition, equipment having a temperature greater than that of the background temperature is referred to as thermal suppression. Numerous attempts have heretofore been made to thermally suppress EG sets, but in each suppressor design serious deficiencies have been encountered.

Efforts have been made to direct the hot gases away from the source and/or to cover the source with a thermal blanket, but these techniques were found to be ineffective when viewed from low flying platforms or from ground level and, in fact, introduced other serious problems in the form of solar heating and night cooling.

SUMMARY OF THE INVENTION

The present invention very effectively overcomes the disadvantages of the prior art while suppressing the thermal signature of the field equipment to within approximately 2° C. of the background, thereby obscuring same from detection.

The general purpose of this invention, then, is to hide thermally hot equipment from thermal detection and recognition devices by utilizing novel thermal suppression techniques while maintaining a cool operating engine.

DESCRIPTION OF THE PREFERRED EMBODIMENTS

This invention may perhaps be best understood by making reference to the several drawings and specifically describing one of the preferred embodiments along with the best mode of fabricating and using same.

The best mode of suppressing the signature of "hot bodies," such as EG sets, essentially contemplates utilizing several layers of a low emissivity material, with air spaces separating the various layers, to envelope the hot object whose thermal signature is to be suppressed. The multiple layers reduce radiated heat transfer and an air flow between the layers effectively reduce the temperature of the various layers. The energy necessary for effecting the air flow may be supplied by the exhaust gasses themselves or the engine intake, depending upon the particular type of EG set being cooled. The solar time lag and solar heating may also be reduced by respectively placing a material with high specific heat below the outside layer of the suppressor and by painting the outside surface with a high reflectivity paint, or by placing fins on the inner surface of the outside layer as shown in FIG. 2b to conduct heat away from the outer surface into the stream of air flowing between the surface layers and thereby dissipate the solar generated heat.

The heat transfer per surface area between any two surfaces due to radiation can be computed from the equation:

$$\frac{Q_{12}}{A} = \frac{\sigma(T_1^4 - T_2^4)}{\frac{1}{\epsilon_1} + \frac{1}{\epsilon_2} - 1}$$

where
$\sigma$ = constant
A = area of surface
$Q_{12}$ = heat transfer between surfaces 1 and 2
$\epsilon_1$, $\epsilon_2$ and $T_1$, $T_2$ are the emissivities and temperatures (°A.) of the two surfaces, respectively.

This process can be progressively repeated for multiple layers to show the effectiveness of employing multiple layers of low emissivity materials for suppressing radiation heat transfer from a "hot body".

Figure 1:
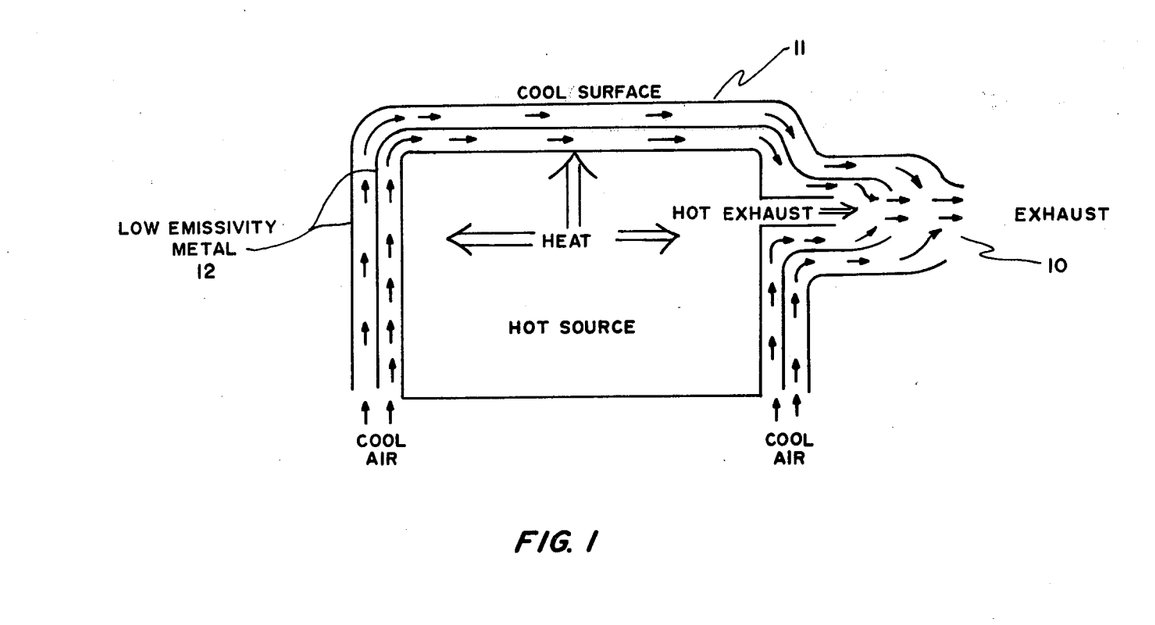
FIG. 1 shows a side sectional view of a basic suppressor enclosure design.

Referring now to FIG. 1, the exhaust of the "hot body" employs several layers (here shown as two) of low emissivity material 12, in such a manner as to utilize the exhaust gasses to provide forced convection to aid in cooling the surface of the multi-layers. As the hot exhaust gasses exit the exhaust port 10, a drop in pressure occurs at the exit, causing air to be drawn between the layers of metal. This technique utilizes low emissivity materials to suppress the radiative heat transfer to the surface and uses the exhaust gasses to draw cool air into the spaces between the suppressor materials. The air between the spaces is cooled by forced convection. The surface 11 can be cooled to essentially any desired value by controlling the number of layers of material, the emissivity of the materials and the amount of forced convection. The engine intake can alternatively be used for forced convection as well as the exhaust.

Figure 2A:
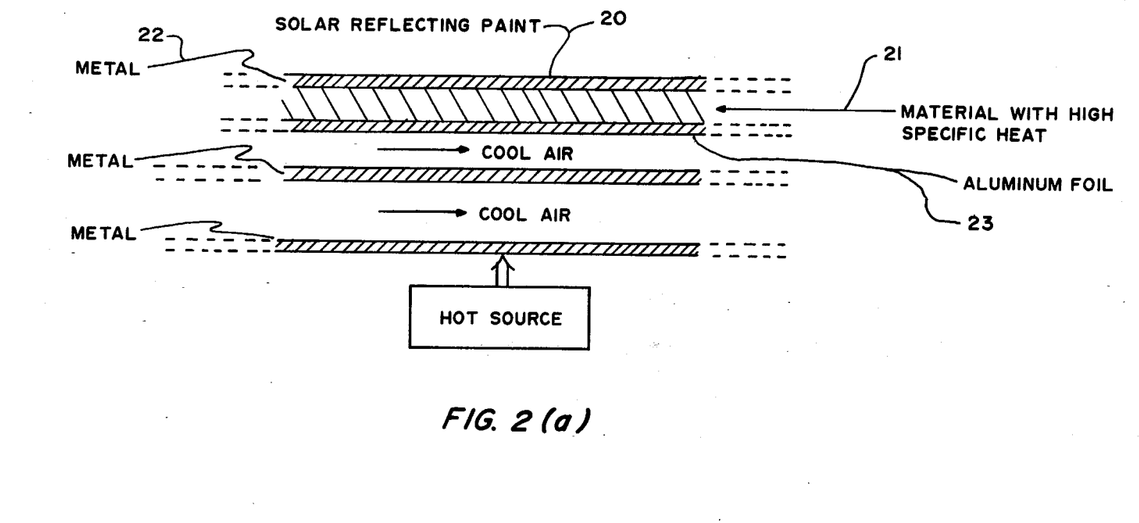
FIGS. 2a and 2b show sectional views of a portion of one wall on a suppressor having solar heat and solar time lag modifications.
Figure 2B:
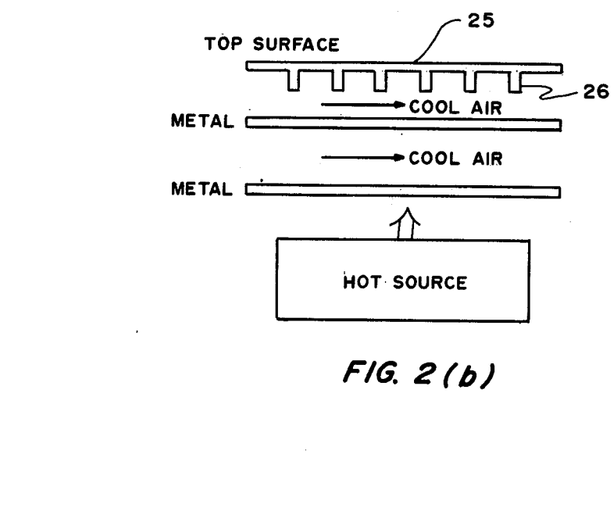

Looking now at FIGS. 2a and 2b and solar heating and solar time lag, all natural or man-made bodies solar heat and cool at night. If an object heats up too fast or cools too rapidly as compared to its natural background, it will stand out against the background by developing a temperature difference above or below the background temperature. This is referred to as solar time lag. The suppressors of this invention use suitable materials to reduce solar heating and cooling and solar time lag by painting the outside surface of the suppressor with a solar reflecting paint 20 while keeping the color within the color limitations of camouflage paint and by applying a material of suitable specific heat 21, such as wood, immediately juxtaposed to the inside layer 22, of the top surface. The heat on the surface of layer 22 caused by solar heating can be carried away by using suitably designed fins on the inside surface of the outside layer 22. Air flow through, around and across these fins carries away the surface heat, thus reducing the temperature of the surface. The solar time lag and solar heating problem can be reduced to essentially any desired value by careful use of this technique.

FIG. 2a shows a sectional view of a multi-layer suppressor wall having a modification of the outer layer 22 to control the solar heating problem and the solar time lag problem. The outer layer is a composite of an aluminum foil 23 or the like layer facing inward toward the hot source to be hidden, attached to the surface of a layer of material 21 having a high specific heat, such as wood, which is subsequently covered on the outside with a metal layer 22 painted with a solar reflecting paint 20.

FIG. 2b shows a sectional view of a multi-layer suppressor wall having a modification of the outer layer 25 to control the solar heating problem and the time lag problem. The outer layer 25 may be sheet of aluminum or galvanized steel or any suitable material facing the sun. The bottom side of the metal sheet 25 has properly designed fins 26 to carry away the surface heat. As the surface heats up from the sun, the heat is conducted to the fins where cool air carries away the heat by convection. The same solar reflecting paint may be used on the outer surface of layer 25 as was used and described in conjunction with layer 22 of FIG. 2a.

Figure 3A:
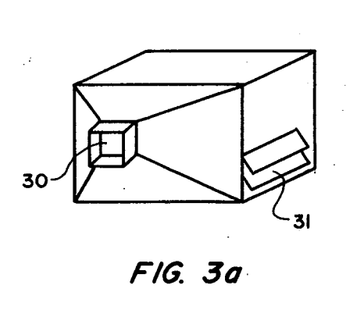
FIGS. 3a–3e are basic design views of a typical suppressor enclosure as envisioned by the instant disclosure.
Figure 3B:
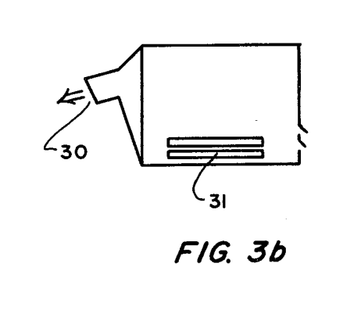
Figure 3C:
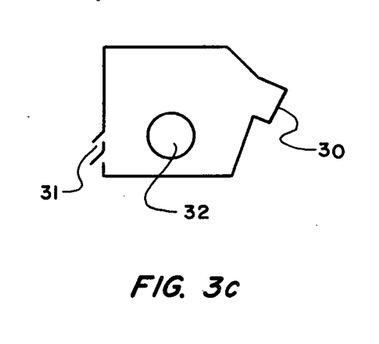
Figure 3D:
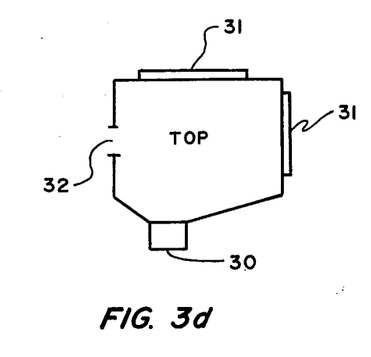

FIGS. 3a through 3e show various views of a basic design for a suppression system for an (EG) set and consists of a multi-layered metallic box, as shown in FIG. 1, designed to fit over the EG set. FIG. 3a shows the box having an exit port 30 to allow engine exhaust and other hot air sources to leave the box. Louvers 31 or the like are designed into the box to allow cool, outside air to be drawn into the box. A hole 32 in the box of FIG. 3c allows cool air to be drawn into the engine intake. By forcing all hot air sources out the exit port 30, a pressure drop is created inside the box, as previously explained and shown in FIG. 1. This pressure drop draws in cool air through the louvers 31, keeping the louvers cool and supplying cool air to cool the engine. The box may be easily removed for easy access to the engine and placing over the engine in shipping. Little additional space is required.

Figure 3E:
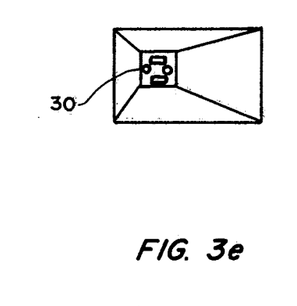
Figure 4A:
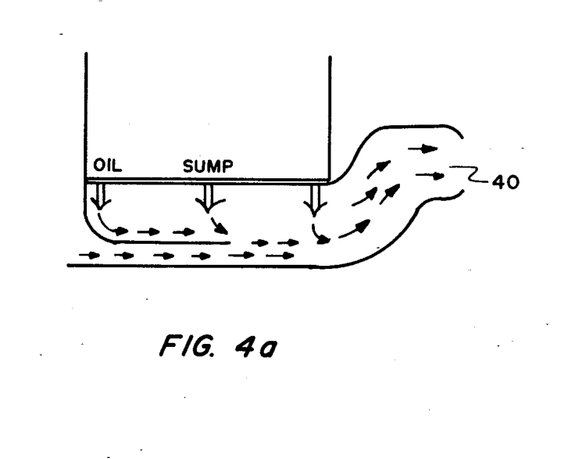
FIGS. 4a and 4b are alternate designs for an oil sump duct.
Figure 4B:
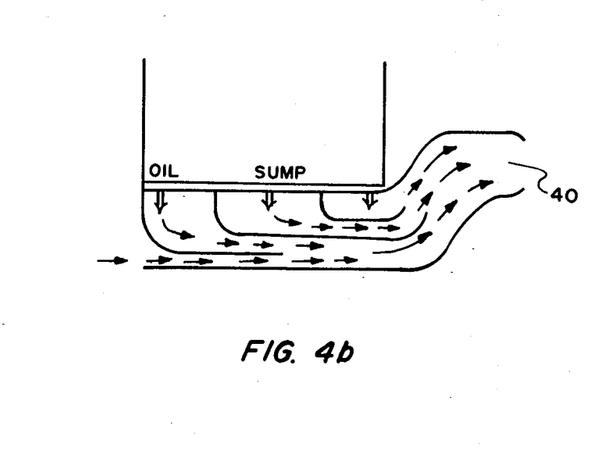
Figure 4C:
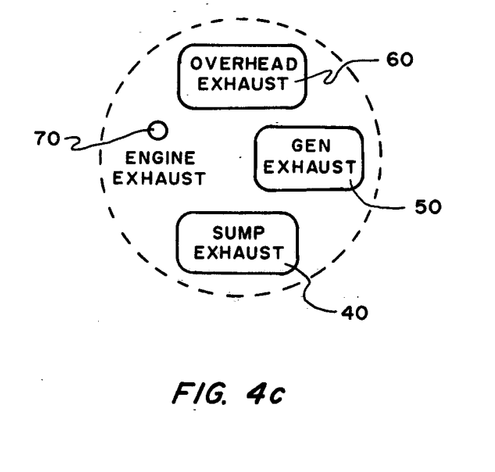
FIG. 4c is an end view of the exhaust area showing the general positioning of the various exhaust ducts.
Figure 5:
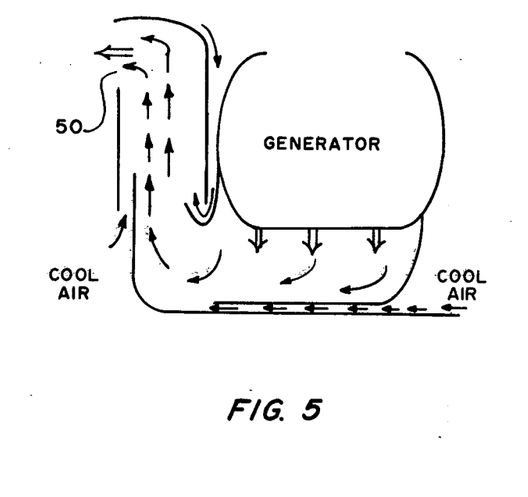
FIG. 5 shows a generator duct design.
Figure 6A:
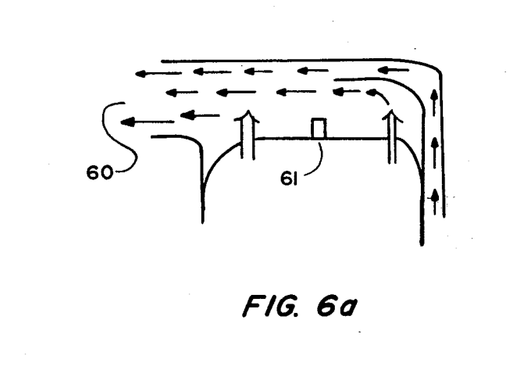
FIGS. 6a and 6b show typical overhead duct designs.
Figure 6B:
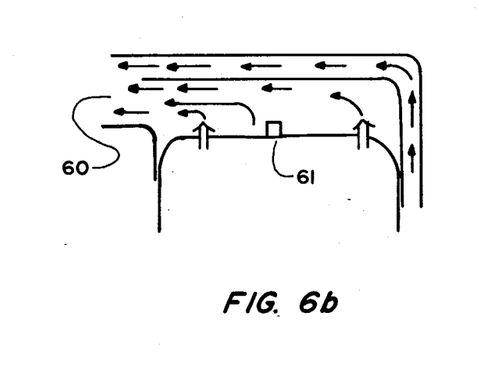
Figure 7:
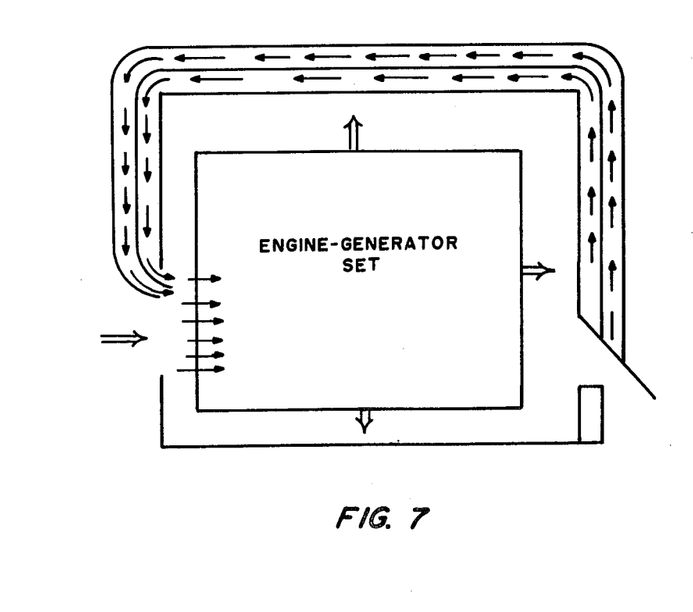
FIG. 7 shows a suppressor box placed over the EG set.

In order to direct all the hot gasses out the exit port 30, three ducts are permanently attached to the EG set. One duct, shown in FIG. 4a with an alternative embodiment in FIG. 4b, directs the hot air from the oil sump area of the engine out the exit port (FIGS. 3e and 4c). One duct (FIG. 5) directs the hot air from beneath the generator area out the generator exhaust port 50. The last duct 60 (FIGS. 6a or 6b alternatively) directs the hot air in the vicinity of the spark plug area 61 out the overhead exit port 60 (FIG. 4c). Each of these ducts are air entrainment ducts and use the hot air in the duct to draw in cool air through openings in the ducts more specifically shown in FIGS. 12 and 13. The outside cover design as shown in FIGS. 3a–3e depicts a three layered box which is simply placed over the operating engine-generator set. More specific details are shown in FIGS. 2 and 7. FIG. 7 shows a cutaway view of an alternate embodiment of FIG. 1 whereby a basic suppressor box is placed over an EG set and incorporates the multiple layer radiation suppression system of FIG. 1 wherein the engine intake port is used for effecting the flow of air between the various layers of material instead of the exhaust port as described in FIG. 1.

It is very important to cool the exhaust pipe or exhaust outlet area. This area can be cooled down to background temperature by the exhaust design shown generally in FIGS. 1 and 4c. The actual exhaust vent is angled toward the ground such that a side looking detector would not be able to see the hot exhaust unless the angle were very low to the ground. It should also be kept in mind that any or all of the separate exhaust systems for the sump exhaust 40, the engine exhaust 70, the generator exhaust 50 and the overhead exhaust 60 can be used singly or in any combination to provide the cooling so desired.

The foregoing description essentially relates to the thermal suppression of the signature of a 1.5 KW EG set but the basic design principles are just as applicable to the entire series of open EG sets used by the military, simply by changing the duct work.

Figure 8:
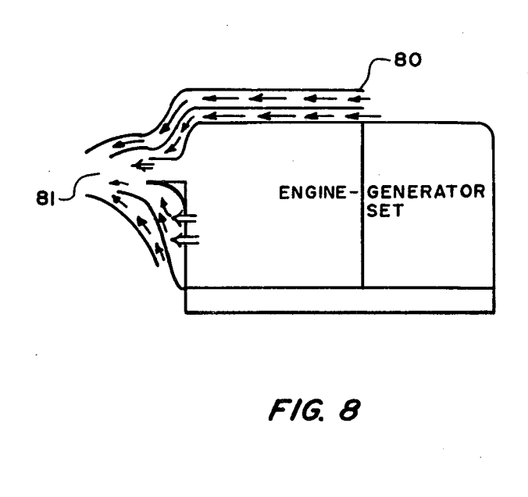
FIG. 8 depicts a scheme for suppressing the horizontal exhaust of an EG set.

Some EG sets such as the 15 KW, 30 KW and 60 KW diesels have horizontal exhaust pipes and are completely enclosed by a metal casing. The only two areas where hot gasses leave the generators are the exhaust pipe and engine cooling outlet. Field tests have shown that these generators are cool in the control panel areas but hot in the exhaust areas, including the top and sides near this point. Referring to FIG. 8, the suppression system for this type of EG set consists of a metal cover 80 which can be permanently attached to an EG set. The cover has an outlet 81 which suppresses the hot exhaust pipe and uses the hot exhaust gasses to cool the outside layer of the suppressor. As in previous designs, low emissivity materials suppress the radiation heat transfer and a suitable solar heat dissipating means placed under the outside layer of the suppressor reduces the problems related to solar heating.

Some EG sets such as the 60 KW turbine, shoot their exhaust straight up into the air whereby the hot exhaust cavity has an outstanding thermal signature. Also, hot gasses from the engine compartment are a blow outside the EG set and introduce an additional hot spot. Baffles surrounding these hot gasses can reach temperatures well above 200° C.

Figure 9:
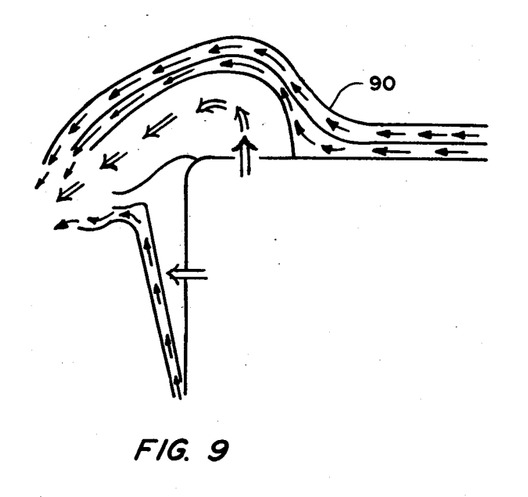
FIG. 9 shows a suppressing design for an EG set with a vertical exhaust.

A suppression system for vertical exhaust is shown in FIG. 9 whereby a multi-layer metal cover 90 can be permanently attached to the EG set with the cover having hinged doors at the proper places to allow maintenance of the set. The cover has an outlet which redirects the exhaust gas in a horizontal direction and the exhaust gas pulls outside air through the multi-layer metal cover to effectively cool the outside layer of the suppressor.

Some EG sets place exhaust pipes and mufflers on the top of the sets. The suppression design of FIG. 10 has been found to be most effective and consists of a multi-layered, low emissivity, metallic suppressor 100 enveloping the muffler 101 and exhaust pipe 102. By use of the exhaust gasses, cool air can be drawn into the layers to cool the outside surface. The suppressor simply bolts onto the top of the generator and cools the entire top.

Figures 10, 11B:
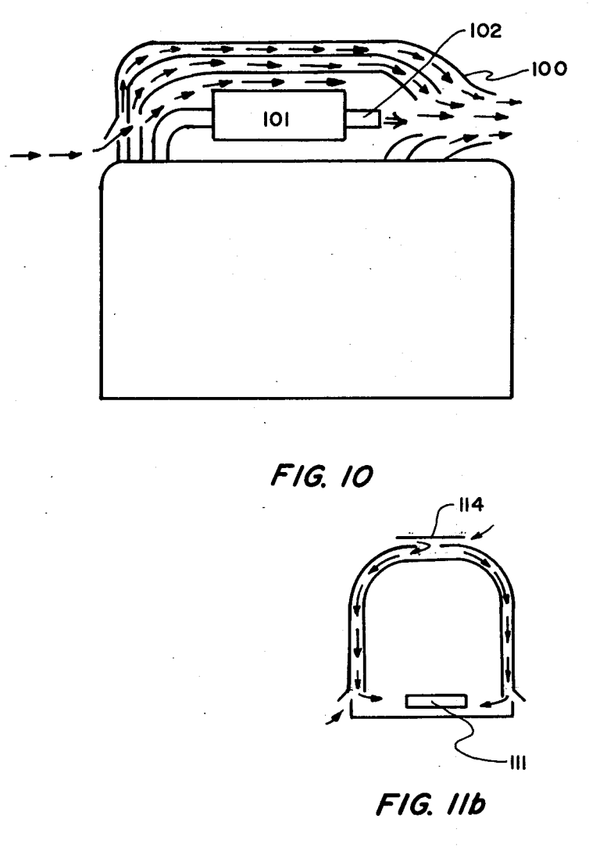
FIG. 10 shows a suppressor design for suppressing the signature of an EG set with an exhaust pipe and muffler on top of the EG set.
FIGS. 11a and 11b show a side and end view, respectively, on one design for a suppressor enclosure.
Figure 11A:
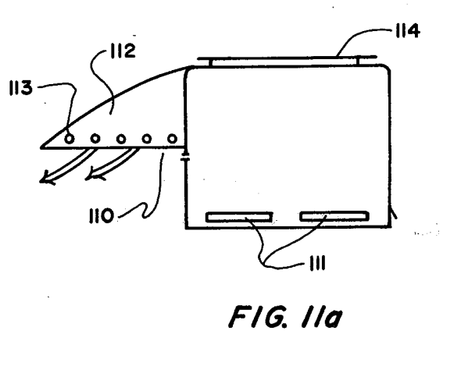

FIGS. 11a and 11b show a specific multi-layer design suppressor to be placed over a "hot box." This design incorporates those features discussed previously. The hood portion 112 of the suppressor is shown extending out over the exhaust exit 110 and is extended downward to the point where detection from a low flying platform or a ground mounted unit would not see the exhaust gasses exiting the suppressor. Louvers 111 and holes 113 in the outer layer of the hood allow cool air to be drawn through the multi-layer unit to lower the detectable signature of the "hot box." The cover sheet 114 mounted on the top of the suppressor acts as a solar heat dissipator and cool air is drawn under the edges to further aid in cooling.

Figure 12:
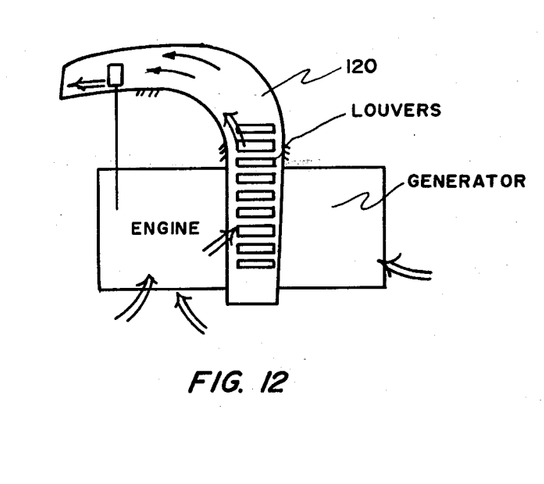
FIGS. 12, 13a and 13b show air entrainment duct work attached directly to an EG set to aid in exhausting heat from the "hot box."
Figure 13A:
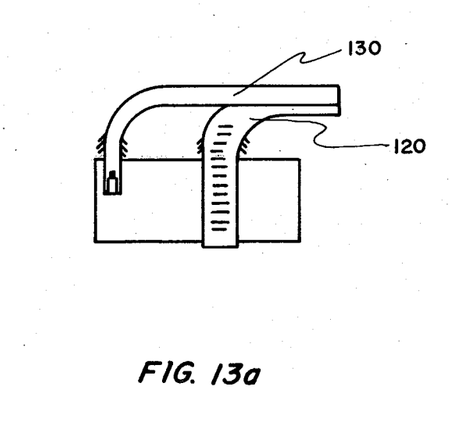
Figure 13B:
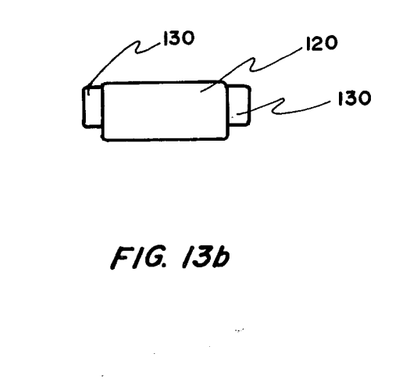

FIGS. 12, 13a and 13b show air entrainment means physically attached to an engine-generator set for directing the exhaust of heat from the "hot body."

The entrainment means 120 of FIGS. 12 and 13a, for instance, are connected between and around the generator and engine sections of the EG set such that a significant portion of the heat generated by the set is captured, mixed with cool air drawn in through the louvers in the entrainment means and expelled through an exit part. FIG. 13a shows a slightly different embodiment from FIG. 12 in that entrainment means are provided for directing heat generated in the vicinity of the exhaust of the engine to the outside environment to further aid in cooling the EG set. FIG. 13b shows a typical arrangement for maintaining the smallest effective exhaust port for the entrainment means. The entrainment of cool air reduces the exhaust gas temperature which lowers the ground heating around the engine.

It should be further noted that in each embodiment herein disclosed a most significant reduction in noise level is realized, which provides further advantages and even greater use for this novel suppressor system. This suppressor system as shown in FIG. 11a and FIG. 11b has only two or three holes for noise to escape to the outside environment. Experiments have shown that all the holes except 110 and 114 can be eliminated thus reducing the sound significantly. Covering the inside layer of FIG. 11b with commercially available sound absorbing material reduces the sound level even more. Finally, using well known sound suppression techniques in the area of 110 further suppresses the noise level. The combination of two holes, sound absorbing material and sound absorbing material in the duct 110 can suppress the noise level down to EPA requirements.

It should also be fully understood that the particular embodiments herein disclosed are merely exemplary and various modifications thereof are so contemplated.

I claim:

1. A technique for reducing the thermal signature of an object having a temperature greater than its environment by:

enclosing the object in a multi-layered enclosure wherein the various layers of material are separated by a space through which cool outside air is caused to flow;

causing air cooler than the object to flow between the layers of the multi-layered enclosure to absorb heat from the surfaces of the various layers of material over which the air flows;

exhausting the heat laden air to the outside environment to effect a reduction in the temperature gradient between the object being cooled and the outside environment; and providing additional cooling by utilizating the air flow through the air entrainment means for cooling the object whose thermal signature is being reduced, whereby a significant portion of the heat emanating from the object may be effectively exhausted to the outside environment.

2. A thermal suppressor for reducing the temperature differential between a "hot body" and the immediate environment, comprising: a multi-layer, walled enclosure composed of at least two layers of low emissivity material separated by an air space; said enclosure surrounding the "hot body", with each successive layer of material separated by an air space through which air is caused to flow to effect a cooling of each respective layer; said enclosure further including means for communicating with the outside environment such that cool air from the outside environment is caused to flow between the successive layers of material and to exit the multi-layered walled enclosure to effect a lowering of the temperature differential between the "hot body" and the environment; and air entrainment means attached to said "hot body" whereby heat emanating from the "hot body" may be effectively expelled into the outside environment.

* * * * *

UNITED STATES PATENT AND TRADEMARK OFFICE
CERTIFICATE OF CORRECTION

PATENT NO. : 4,413,668

DATED : November 8, 1983

INVENTOR(S) : Edward F. Allard

It is certified that error appears in the above-identified patent and that said Letters Patent is hereby corrected as shown below:

Column 1, line 2,

Preceding the BACKGROUND OF THE INVENTION insert:

GOVERNMENT INTEREST

The invention described herein may be manufactured, used, and licensed by or for the Government for governmental purposes without payment to patentee of any royalty thereon. This application is held to be a reportable invention under Government Contract No. DAAK70-78-C-0714 in accordance with the decision of the Armed Services Board of Contract Appeals, ASBCA No. 25,607 rendered May 30, 1985.

Signed and Sealed this

Eighteenth Day of November, 1986

Attest:

DONALD J. QUIGG

Attesting Officer      Commissioner of Patents and Trademarks

UNITED STATES PATENT AND TRADEMARK OFFICE
CERTIFICATE OF CORRECTION

PATENT NO. : 4,413,668

DATED : November 8, 1983

INVENTOR(S) : Edward F. Allard

It is certified that error appears in the above-identified patent and that said Letters Patent is hereby corrected as shown below:

Column 1, line 2,

Preceding the BACKGROUND OF THE INVENTION insert:

GOVERNMENT INTEREST

The invention described herein may be manufactured, used, and licensed by or for the Government for governmental purposes without payment to patentee of any royalty thereon. This application is held to be a reportable invention under Government Contract No. DAAK70-78-C-0174 in accordance with the decision of the Armed Services Board of Contract Appeals, ASBCA No. 25,607 rendered May 30, 1985.

This certificate supersedes Certificate of Correction issued November 18, 1986.

Signed and Sealed this

Third Day of March, 1987

*Attest:*

DONALD J. QUIGG

*Attesting Officer*  *Commissioner of Patents and Trademarks*